(12) United States Patent
Zhang

(10) Patent No.: US 12,188,680 B2
(45) Date of Patent: Jan. 7, 2025

(54) AIR FILTER APPARATUS

(71) Applicant: Brandon Zhang, Vancouver (CA)

(72) Inventor: Brandon Zhang, Vancouver (CA)

( * ) Notice: Subject to any disclaimer, the term of this patent is extended or adjusted under 35 U.S.C. 154(b) by 452 days.

(21) Appl. No.: 17/555,324

(22) Filed: Dec. 17, 2021

(65) Prior Publication Data

US 2022/0196261 A1 Jun. 23, 2022

Related U.S. Application Data

(60) Provisional application No. 63/127,157, filed on Dec. 18, 2020.

(51) Int. Cl.
| | | |
|---|---|---|
| B01D 53/18 | (2006.01) | |
| F24F 3/14 | (2006.01) | |
| F24F 8/108 | (2021.01) | |
| F24F 8/133 | (2021.01) | |
| F24F 11/39 | (2018.01) | |
| H04W 4/80 | (2018.01) | |

(52) U.S. Cl.
CPC ............... *F24F 3/14* (2013.01); *F24F 8/108* (2021.01); *F24F 8/133* (2021.01); *F24F 11/39* (2018.01); *H04W 4/80* (2018.02); *F24F 2003/1446* (2013.01)

(58) Field of Classification Search
CPC .... F24F 3/14; F24F 8/108; F24F 8/133; F24F 11/39; F24F 2003/1446; H04W 4/80; B01D 53/14; B01D 53/1406; B01D 53/1412; B01D 53/18
USPC .............. 96/279, 351–354, 342–345; 95/149
See application file for complete search history.

(56) References Cited

U.S. PATENT DOCUMENTS

| | | | | |
|---|---|---|---|---|
| 2,405,494 | A * | 8/1946 | Charles .................... | F24F 6/12 96/345 |
| 5,078,759 | A * | 1/1992 | Kira ...................... | B01D 47/021 261/121.1 |
| 6,391,093 | B1 * | 5/2002 | French ............... | B23K 26/1435 96/353 |
| 6,616,733 | B1 * | 9/2003 | Pellegrin .............. | B01D 47/021 96/279 |
| 6,626,983 | B1 * | 9/2003 | Cairns ....................... | F01N 3/04 96/336 |

(Continued)

FOREIGN PATENT DOCUMENTS

GB 2428469 A * 1/2007 ............. B01D 46/10

*Primary Examiner* — Frank M Lawrence, Jr.
(74) *Attorney, Agent, or Firm* — Jose W. Jimenez; Robert Cantrell; JIMENEZ LAW FIRM

(57) ABSTRACT

A system and method for filtering contaminants from air has a housing assembly further comprising at least one air inlet and outlet. An intake fan assembly draws air in and propels the air through at least one tube assembly leading to a bottom portion of a removable aqueous solution tank member. A plurality of hole members lines an upper surface of a submerged portion of the tube assembly from which bubbles travel upward through an aqueous solution to a condensing chamber assembly. At least one cooling condenser coil assembly in a first duct cools the air to removing humidity and contaminants, the air then traveling to a second duct bearing a heating coil assembly. The air travels through the second duct to a dry filtration system including a removable carbon filter screen fronting the exit portion. At least one electric motor assembly and LED control assembly permits and controls operation.

19 Claims, 12 Drawing Sheets

(56) References Cited

U.S. PATENT DOCUMENTS

| | | | | |
|---|---|---|---|---|
| 8,313,564 B2* | 11/2012 | Kwack | ................... | B01D 50/60 96/353 |
| 10,456,736 B2* | 10/2019 | Zhu | ................... | B01D 53/1406 |
| 2006/0107449 A1* | 5/2006 | Lan | ........................... | E03D 9/05 4/213 |

* cited by examiner

201
Activate a power control actuator disposed on a housing assembly, the actuator activating at least one electric motor assembly, the electric motor assembly operating the at least one intake fan assembly, the at least one cooling condenser coil assembly, and the at least one heating coil assembly.

205
Check and set the control members disposed on a control unit system having at least one or more from the group of: the power control actuator, the timer, the filter screen monitor, the fan control member, and the water quality sensor member.

210
Permit air to enter the at least one air inlet portion of the housing assembly further comprising the at least one air inlet portion and the at least one air exit portion.

215
Draw—via the intake fan assembly operationally coupled to the air inlet portion—air from outside the housing assembly and propel the air through the at least one tube assembly leading to the bottom portion of the aqueous solution tank member holding the aqueous solution.

(B)

AIR FILTER APPARATUS

CLAIM OF PRIORITY

This application claims the benefit of and priority to U.S. provisional application No. 63/127,157 filed on Dec. 18, 2020, titled AIR FILTER APPARATUS, the contents of which are incorporated by reference in its entirety.

FIELD OF THE INVENTION

The inventive concept relates generally to an air filter apparatus.

BACKGROUND

Currently, there are many solutions available for air filtration. One of these solutions attempts to utilize a smart air filter, but this solution fails to meet the needs of the market because smart air filters are expensive. Another solution attempts to utilize a standard filter, but this solution is similarly unable to meet the needs of the market because standard filters can be unreliable. Still another solution seeks to utilize internal air filters, but this solution also fails to meet market needs because such solutions are not portable. Therefore, there currently exists a need in the market for an improved apparatus that filters ambient air.

SUMMARY OF THE INVENTION

A system for filtering contaminants from air has a housing assembly further comprising at least one air inlet portion and at least one air exit portion. An intake fan assembly is operationally coupled to the air inlet portion designed to draw air from outside the housing assembly and propel the air through an at least one tube assembly leading to a bottom portion of a removable aqueous solution tank member holding an aqueous solution. A plurality of hole members is disposed substantially on an upper surface of a submerged portion of the at least one tube assembly, the hole members designed to release bubbles from the at least one tube assembly wherein the bubbles travel upward through the aqueous solution to a condensing chamber assembly. At least one cooling condenser coil assembly is disposed in a first duct portion designed to cool the air released from the bubbles, removing humidity and contaminants from the air, the humidity and contaminants gravitationally drawn toward the aqueous solution tank member, the air traveling to a second duct portion. At least one heating coil assembly is at least partially heated by heat generated from the cooling mechanism, the heating coil assembly disposed in a second duct portion designed to heat air traveling through the second duct portion. A dry filtration system is operationally coupled to the second duct portion and overlaying the at least one air exit portion wherein the air must pass through at least one removable carbon filter screen assembly to pass through the air exit portion. At least one electric motor assembly and control assembly is operationally coupled to the intake fan assembly, the cooling condenser coil assembly, and the heating coil assembly.

In one embodiment of the system for filtering contaminants from air, the control assembly is substantially an LED touch panel interface displaying at least a timer, speed selector, water quality monitor, filter replacement indicator, and power button actuator. Other controls may be included.

In one embodiment of the system for filtering contaminants from air, a door at a base portion of the housing assembly provides access to remove the removable aqueous solution tank member.

In one embodiment of the system for filtering contaminants from air, an outwardly slidable air filter tray is designed to hold the at least one removable carbon filter screen assembly composed of materials including but not limited to activated carbon. In related embodiments, the filter screen may comprise any appropriate filtering material and is not just limited to activated carbon so remove VOCs or other particulate from the ambient air.

It would be advantageous to have a system for filtering contaminants from air that is reusable. Furthermore, it would be advantageous to have a system for filtering contaminants from air that has a touch screen control. Still further, it would be advantageous to have a system for filtering contaminants from air that is adjustable.

The aqueous solution in the preferred embodiment is water but can be other liquids or partially other liquids The system for filtering contaminants from air advantageously fills the aforementioned deficiencies by providing an air filter which uses water to economically purify air.

The system for filtering contaminants from air is a water-based air purifier which includes an LED touch screen controls for user convenience. Further, the system described herein provides for at least three fan speeds for improving energy efficiencies.

Among other things, it is an advantage of the system for filtering contaminants from air to provide an air filter that does not suffer from problems or deficiencies associated with prior solutions, such as having a system that is reusable and includes a removable water tank for implementing such advantage.

The inventive concept now will be described more fully hereinafter with reference to the accompanying drawings, which are intended to be read in conjunction with both this summary, the detailed description and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

BRIEF DESCRIPTION OF THE DRAWINGS

FIGS. 10A-10C illustrate a method of using the system for filtering contaminants from air.

DETAILED DESCRIPTION OF THE INVENTION

Figure 1:
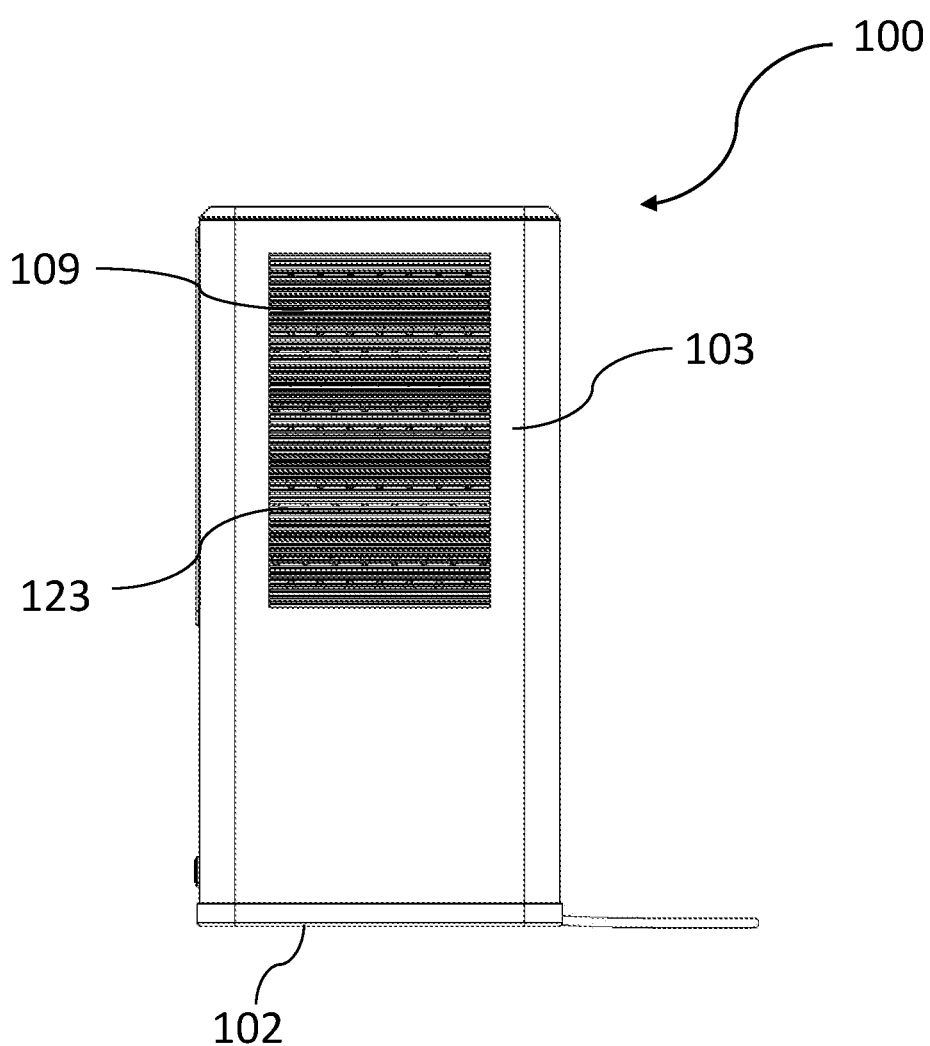
FIG. 1 illustrates the front view of a system for filtering contaminants from ambient air in a room or habitat.
Figure 2:
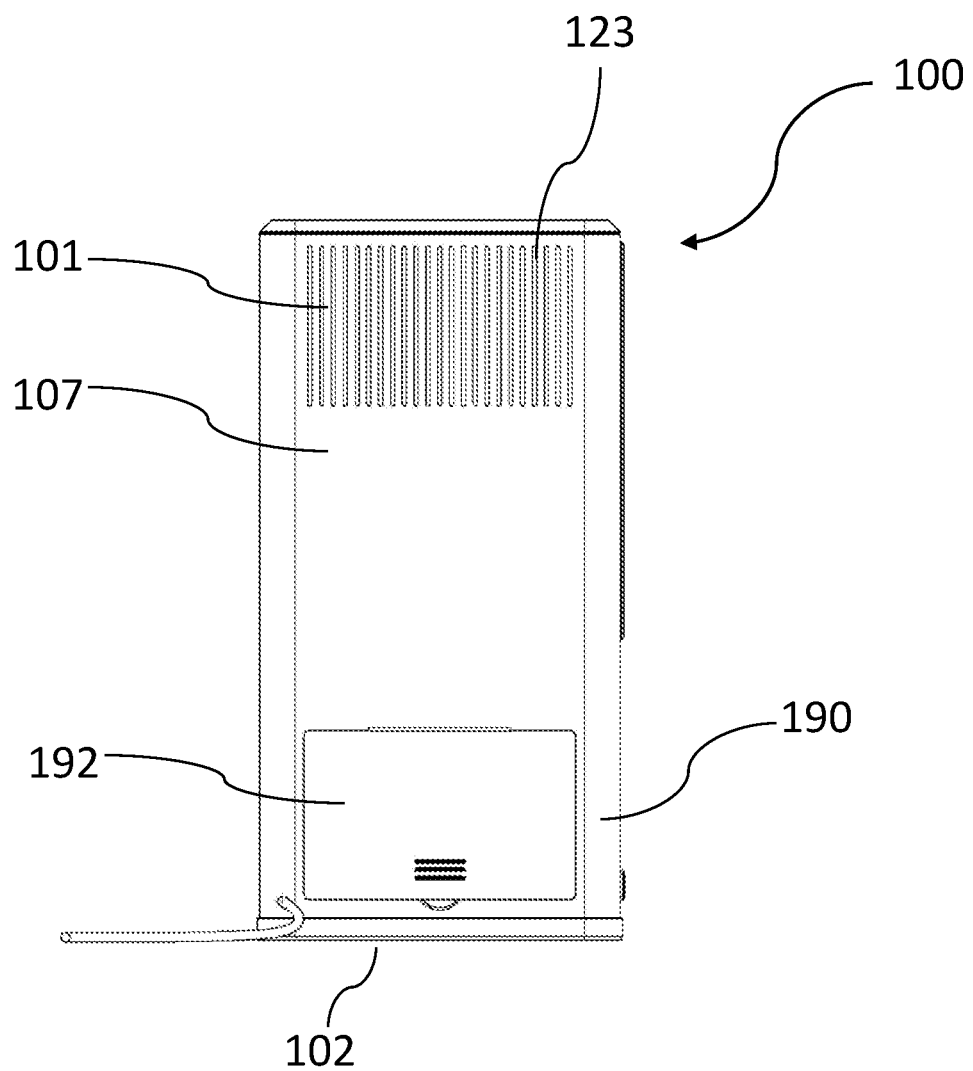
FIG. 2 illustrates the back view of the system for filtering contaminants from ambient air.
Figure 3:
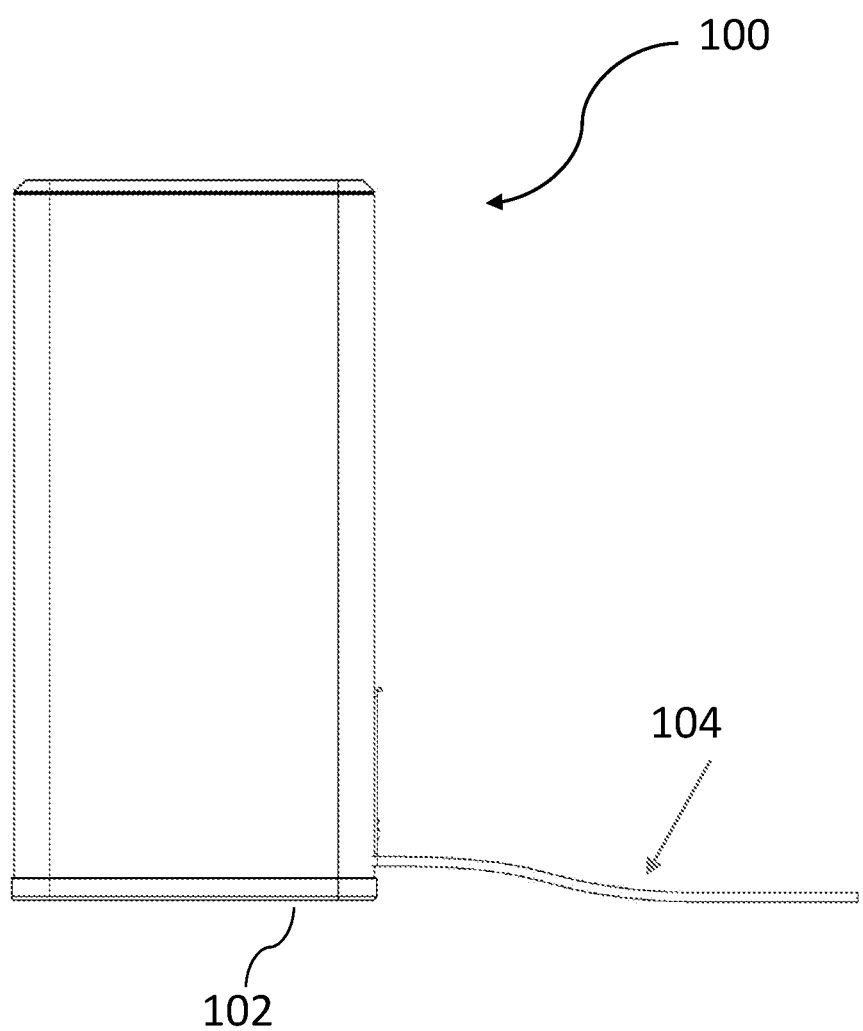
FIG. 3 illustrates the right-side view of the system for filtering contaminants from ambient air.
Figure 4:
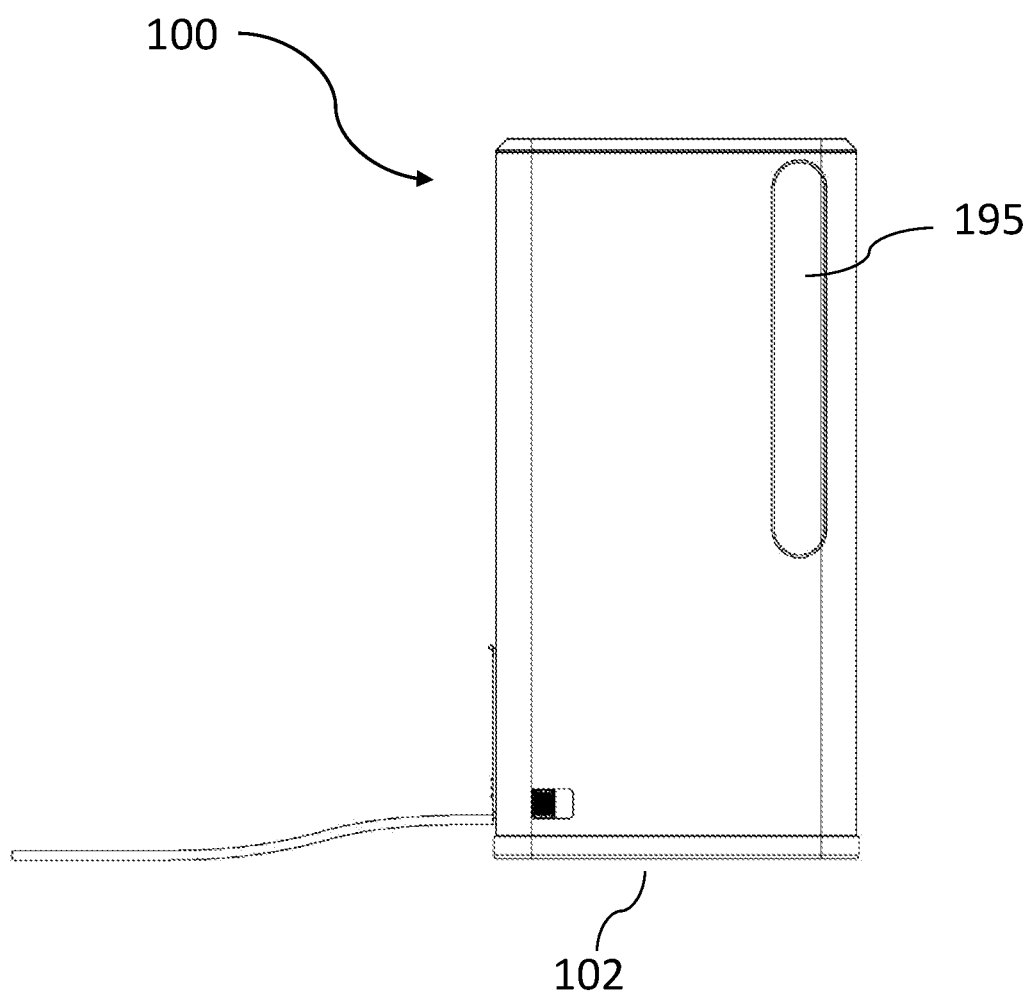
FIG. 4 illustrates the left side view of the system for filtering contaminants from ambient air.

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Referring to the Figures, FIGS. 1-9 illustrate a system 10 for filtering contaminants from ambient air that has a housing assembly 100 including at least one air inlet portion or vent 101 and at least one air exit or outlet portion 109 and power cable 104 connectable to a power source. In this example embodiment, housing assembly 100 is substantially cuboid and has the at least one air inlet portion 101 disposed on an upper front portion of the housing assembly 107 and the at least one air exit portion 109 disposed on an upper back portion of the housing assembly 103. Further included is an intake fan assembly (or pump or blower) 120 that is operationally coupled to the air inlet portion 101 designed to draw ambient air from outside the housing assembly 100 and propel the air through the tube assembly 130 leading to the bottom portion 149 of the removable aqueous solution tank member 140 holding substantially water or another aqueous solution 148. The at least one tube assembly 130 is L-shaped and the entire assembly 130 can be elevated or raised substantially vertically from the aqueous solution tank member 140. The removable aqueous solution tank member 140 is removable slidably and horizontally from a lower door member 192 of the housing assembly 100.

Figure 8:
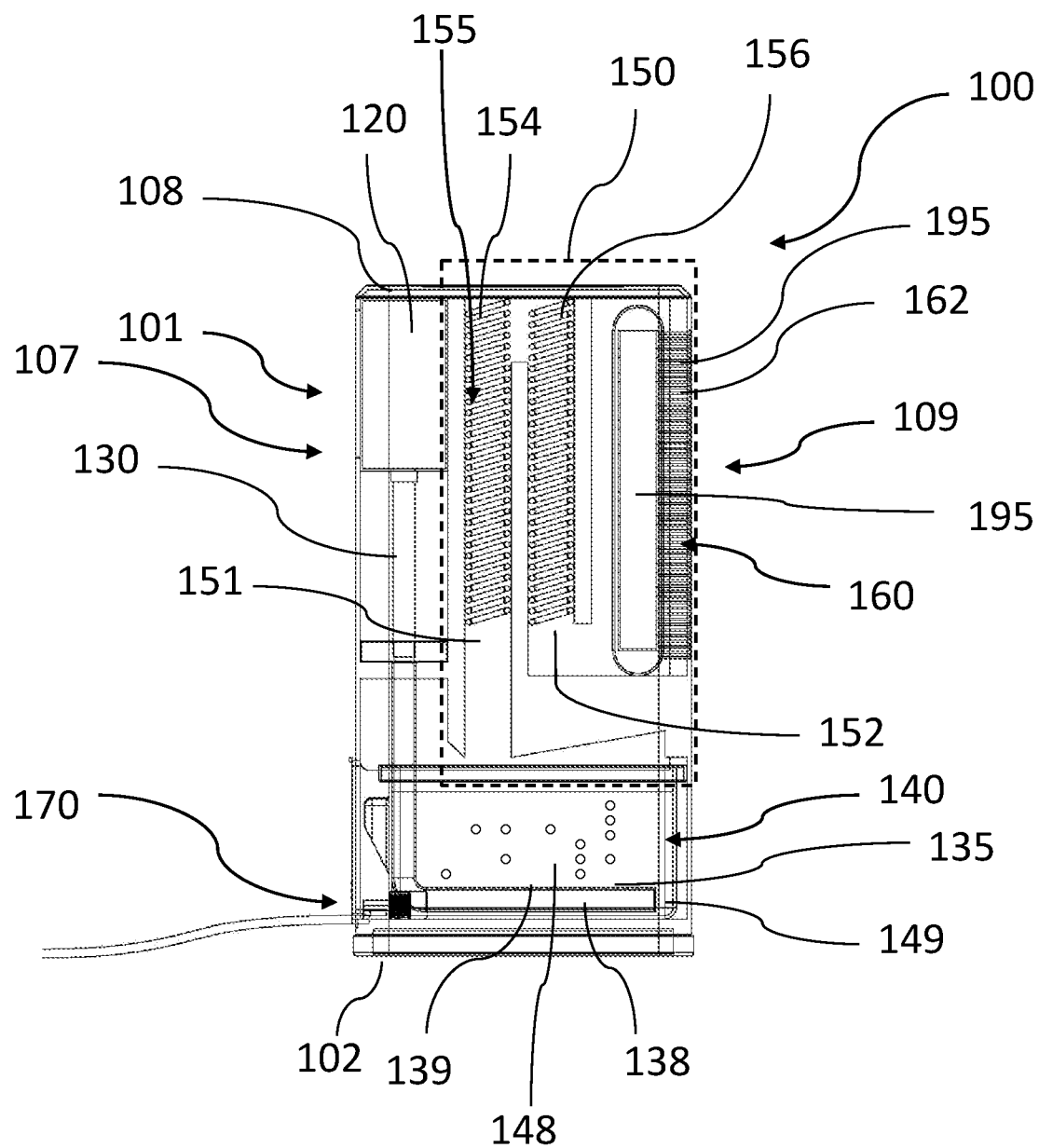
FIG. 8 illustrates the internal view of the system for filtering contaminants from ambient air.
Figure 9:
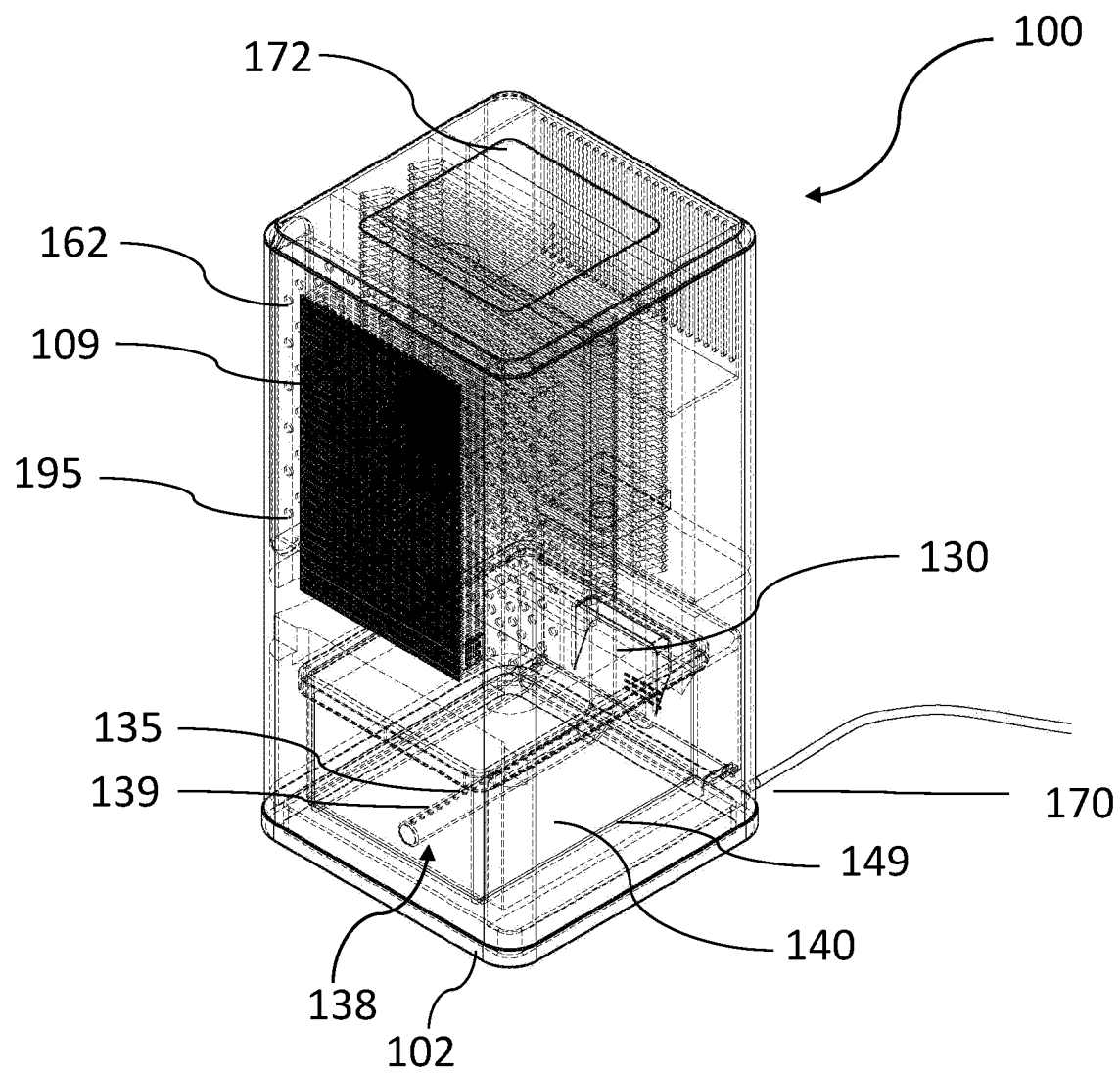
FIG. 9 illustrates the internal perspective view of the system for filtering contaminants from ambient air.

FIGS. 8 and 9 illustrate more specifically the internal workings of the filtering system 10 which further includes tube assembly 130 having a plurality of hole members 135 disposed substantially on an upper surface 139 of a submerged portion 138 of the at least one tube assembly 130. Hole members 135 are designed to release ambient air bubbles 22 from the at least one tube assembly 130 into the aqueous solution 148 after which the bubbles 22 travel upward through an aqueous solution 148 in the aqueous solution tank member 140 to a condensing chamber assembly 150. At least one cooling condenser coil assembly 154 is disposed in a first duct portion 151 designed to cool the air released from the bubbles 22, removing humidity and contaminants from the air. The humidity and contaminants are then gravitationally drawn toward the aqueous solution tank member 140 with the air traveling to a second duct portion 152.

Referring more specifically to FIGS. 8-9 there is further illustrated at least one heating coil assembly 156 that is at least partially heated by heat generated from the cooling mechanism 155. In this example embodiment heating coil assembly 156 is disposed in a second duct portion 152 designed to heat air traveling through the second duct portion 152. A dry filtration system 160 is operationally coupled to the second duct portion 152 and overlays the at least one air exit portion 109 such that the partially filtered/ cleansed air passes through at least one removable filter screen assembly 162 before passing through the air exit portion or vent 109.

In this example embodiment, at least one electric motor assembly 170 and control assembly 172 is operationally coupled to the intake fan assembly 120, the cooling condenser coil assembly 154, and the heating coil assembly 156.

FIGS. 1-9 further illustrate one embodiment of the system for filtering contaminants from air wherein the control assembly 172 is substantially an LED touch panel interface 185 displaying at least a timer 181, fan control member 183, water quality monitor 184, carbon filter screen monitor 182, and power button actuator 180. In one embodiment, the control assembly 172 is disposed on a top surface of the housing assembly 108.

FIGS. 1-9 further illustrate one embodiment of the system for filtering contaminants from air wherein a door 192 at a base portion of the housing assembly 190 provides access to remove the removable aqueous solution tank member 140.

FIGS. 1-9 further illustrate one embodiment of the system for filtering contaminants from air wherein an outwardly slidable air filter tray 195 is designed to hold the at least one removable carbon filter screen assembly 162.

FIGS. 1-9 further illustrate one embodiment of the system for filtering contaminants wherein the intake fan assembly 120 has three selectable fan speeds.

FIGS. 1-9 further illustrate one embodiment of the system for filtering contaminants wherein the water tank member 140 is removable.

FIGS. 1-9 further illustrate one embodiment of the system for filtering contaminants wherein at least one water sensor member is designed to detect water contaminants.

FIGS. 1-9 further illustrate one embodiment of the system for filtering contaminants wherein the at least one tube assembly 130 is L-shaped and may be raised substantially vertically from the aqueous solution tank member 140.

Figure 5:
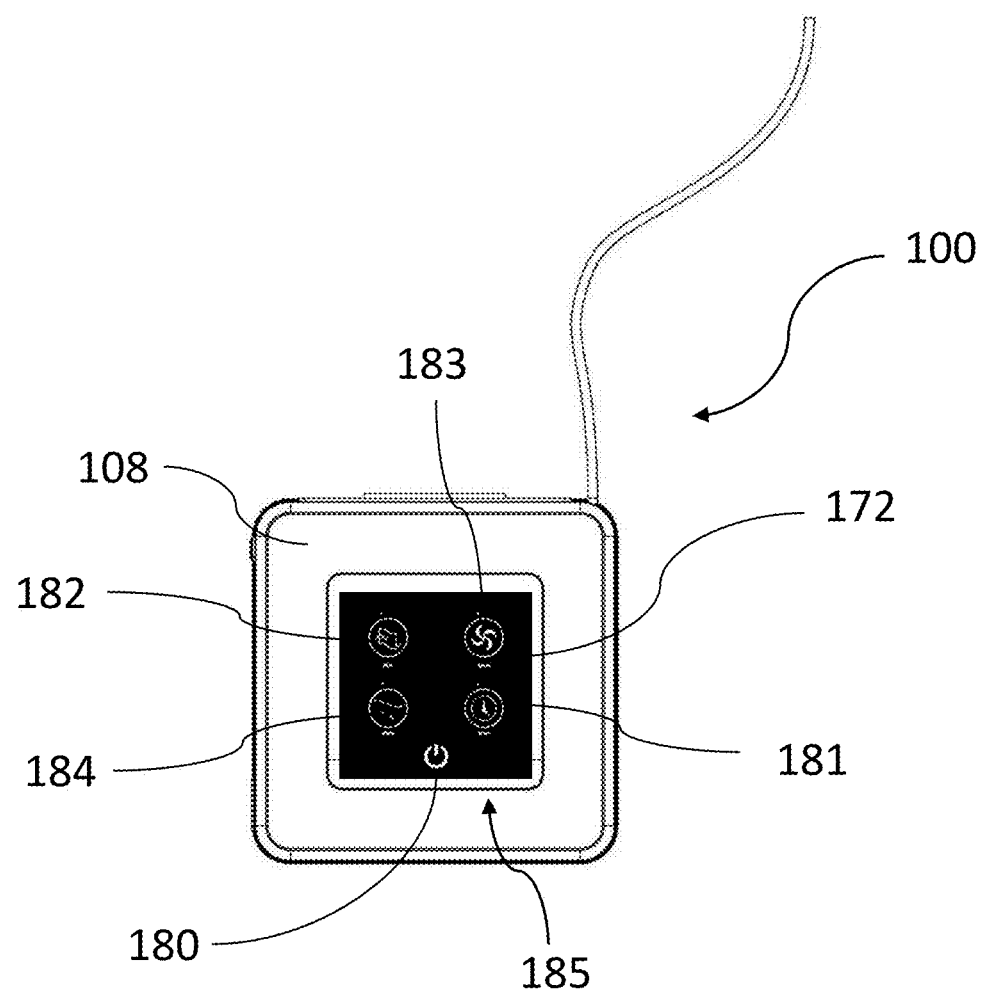
FIG. 5 illustrates the top view of the system for filtering contaminants from air.
Figure 6:
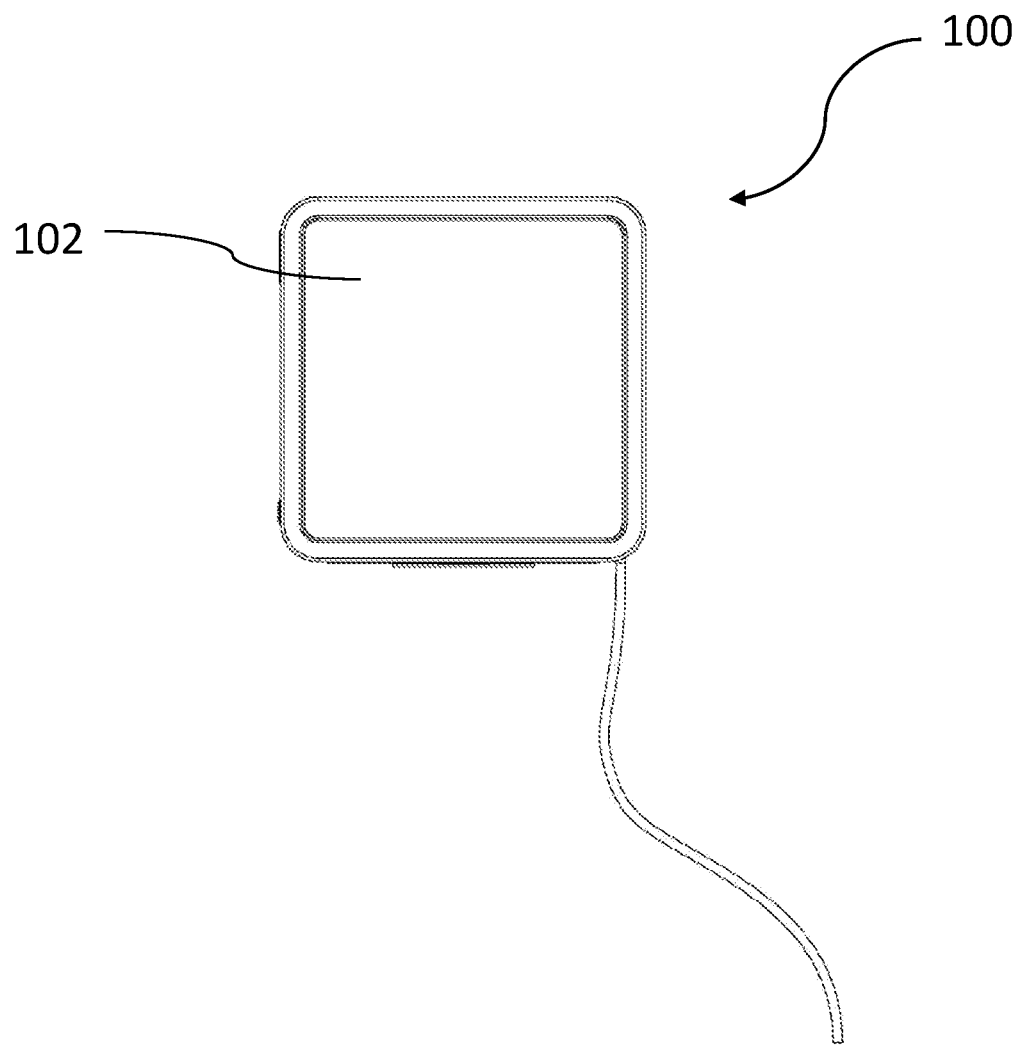
FIG. 6 illustrates the bottom view of the system for filtering contaminants from air.
Figure 7:
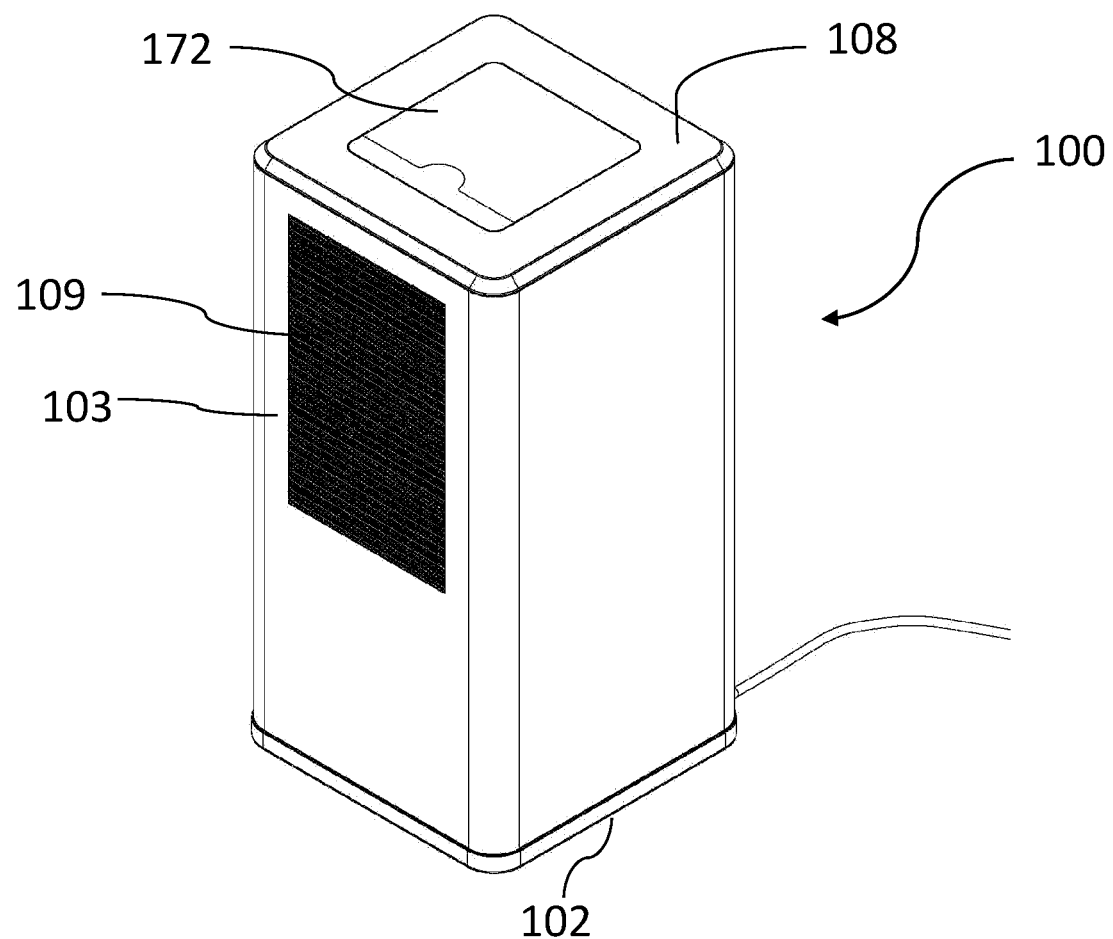
FIG. 7 illustrates the perspective view of the system for filtering contaminants from air.

Referring now more specifically to FIGS. 1, 5 and 7 there is included in this example embodiment at least one water quality monitor 184 is designed to detect water contaminants from aqueous solution 148. The plurality of hole members 135 is disposed substantially on the upper surface 139 of the submerged portion 138 of the L-shaped tube assembly 130, the hole members 135 designed to release air bubbles 22 from the tube assembly 130 such that the bubbles 22 travel upward through the aqueous solution 148 to the condensing chamber assembly 150. In other related embodiments, plurality of hole members 135 are located at other parts of the submerged portion 138 of the tube assembly. The dry filtration system 160 is operationally coupled to the second duct portion 152 and overlays the at least one air exit portion 109 wherein the partially filtered air must pass through the at least one removable carbon filter screen assembly 162 within at least one substantially porous sleeve member to pass through the air exit portion 109. The control unit system is disposed on the top portion of the housing assembly 108, the control unit system having at least one or more from the group of: the power control actuator 180, the timer 181, the carbon filter screen monitor 182, the fan control member 183, and the water quality monitor 184. At least one electric motor assembly 170 and control assembly 172 is operationally coupled to the intake fan assembly 120, the cooling condenser coil assembly 154, and the heating coil assembly 156.

FIGS. 1-9 further illustrate an embodiment of the system for filtering contaminants wherein the control unit system 172 has at least one or more from the group of: the power control actuator 180, the timer 181, the carbon filter screen monitor 182, the fan control member 183, and the water quality sensor member 184, all lit by an LED light of the LED touch panel interface 185.

FIGS. 1-9 further illustrate one embodiment of the system for filtering contaminants wherein the air inlet portion 101 and the air exit portion 109 are protected from the outside by parallelly-oriented screening bars 123.

In related embodiments, cooling/heating mechanisms implemented are not limited to the above description and can include other viable systems as condenser coils are not the only way to achieve the desired result. For example, thermoelectric heating/cooling is a known viable alternative, and potentially superior for the moderate temperature range used in this machine.

In another related example embodiment, a solid phase adsorbent material is added to or into the water. Such a material is made economically and improves the filtering capacity of the aqueous solution. In another related embodiment, additional avenues of airflow into and out of the heating assembly can be added to the system thereby allowing the user to vary the temperature of the purified air to meet cooling/heating requirements. In other words, heat can be redirected out of the room through a separate exit or additional heating elements can be used to heat the air. In yet another related embodiment, air filtering device is made portable by including a rechargeable power source (or batter) and/or the inclusion of a solar panel or cell to provide energy to the device or to charge the battery. In yet another example embodiment, the air filtering device includes a radio frequency transceiver for two-way communication and control of the filtering device. Further, the air filtering device includes a microcontroller configured to control the operations of the various components including but not limited to a power control actuator, a timer, a carbon filter screen monitor, a fan control member, and the water quality sensor member are lit by an LED of an LED touch panel interface. In yet another example embodiment, the air filtering device includes a microphone and a speaker for near field communications, control and remote or near configuration of filtering operations of the filtering device.

Figure 10B:
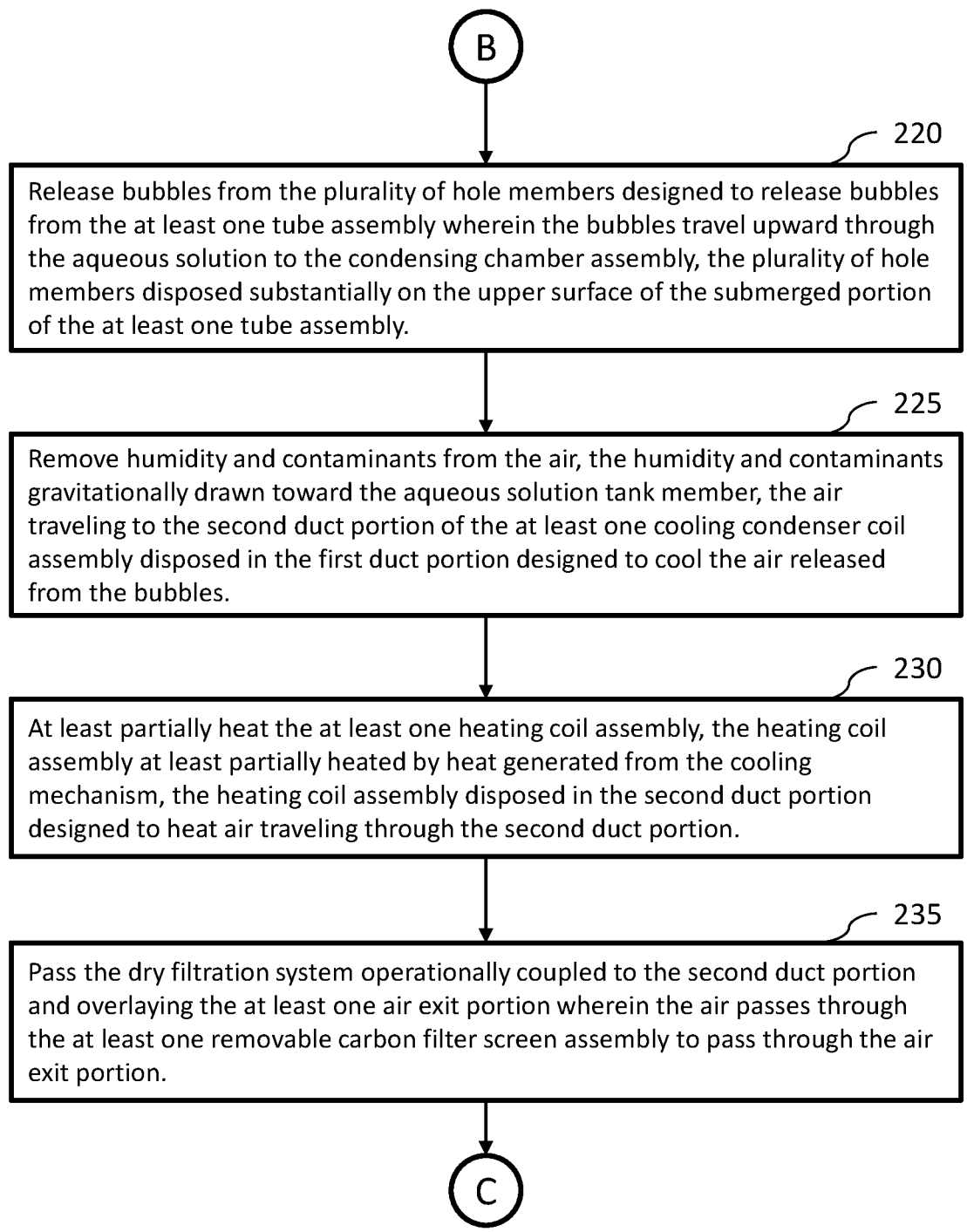
Figure 10C:
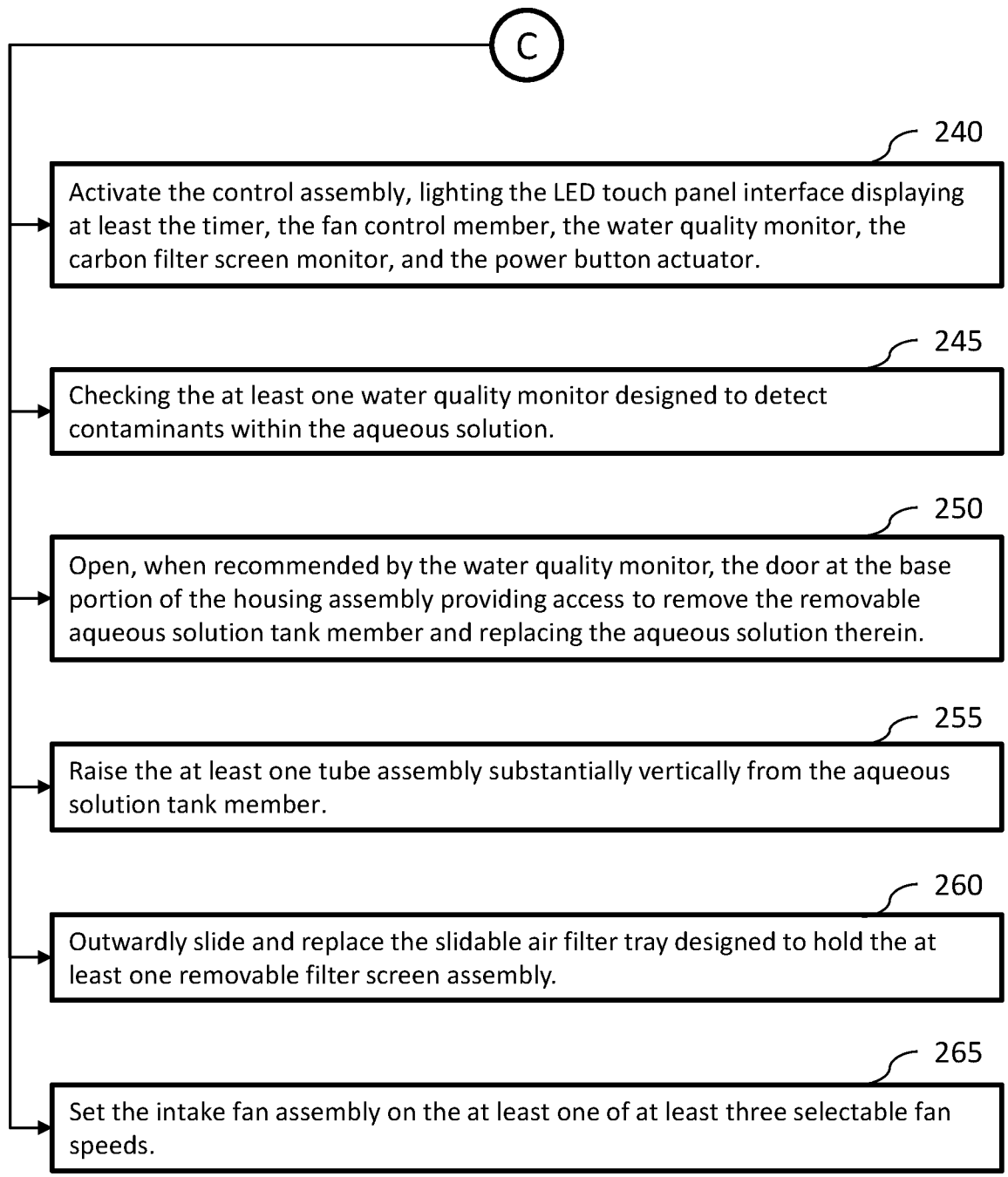

Referring now to FIGS. 10A-10C there is illustrated a method 200 for filtering contaminants from air, the method 200 including the step 201 of activating a power control actuator 180 disposed on a housing assembly 100, the actuator 180 activating at least one electric motor assembly 170, the electric motor assembly 170 operating the at least one intake fan assembly 120, the at least one cooling condenser coil assembly 154, and the at least one heating coil assembly 156. The method 200 further includes the step 205 of checking and setting the control members disposed on a control unit system 150 having at least one or more from the group of: the power control actuator 180, the timer 181, the filter screen monitor 182, the fan control member 183, and the water quality sensor member 184. The method further includes the step 210 of permitting air to enter the at least one air inlet portion 101 of the housing assembly 100 further comprising the at least one air inlet portion 101 and the at least one air exit portion 109.

The method 200 further includes the step 215 using the intake fan assembly 120 operationally coupled to the air inlet portion 101 for drawing air from outside the housing assembly 100 and propelling the air through the at least one tube assembly 130 leading to the bottom portion 149 of the aqueous solution tank member 140 holding the aqueous solution 148. The method further includes the step 220 of releasing bubbles from the plurality of hole members 135 designed to release bubbles from the at least one tube assembly 130 wherein the bubbles 22 travel upward through the aqueous solution 148 to the condensing chamber assembly 150, the plurality of hole members 135 disposed substantially on the upper surface of the submerged portion 139 of the at least one tube assembly 130.

FIGS. 10A-10C, there is illustrated a method further includes the step 225 of removing humidity and contaminants from the air, the humidity and contaminants gravitationally drawn toward the aqueous solution tank member 140, the air traveling to the second duct portion 152 of the at least one cooling condenser coil assembly 154 disposed in the first duct portion 151 designed to cool the air released from the bubbles. The method further includes the step 230 of at least partially heating the at least one heating coil assembly 156, the heating coil assembly 156 at least partially heated by heat generated from the cooling mechanism 150, the heating coil assembly 156 disposed in the second duct portion 152 designed to heat air traveling through the second duct portion 152. The method further includes the step 235 of passing the ambient air through dry filtration system 160 operationally coupled to the second duct portion 152 and overlaying the at least one air exit portion 109 such that the air passes through the at least one removable carbon filter screen assembly 162 to pass through the air exit portion 109.

FIGS. 10A-10C illustrate that the method for filtering contaminants which may further include the step 240 of activating the control assembly 172, lighting the LED touch panel interface 185 displaying at least the timer 181, the fan control member 183, the water quality monitor 184, the carbon filter screen monitor 182, and the power button actuator 180. FIGS. 10A-10C illustrate that the method for filtering contaminants which may further include the step 245 of checking the at least one water quality monitor 184 designed to detect contaminants within the aqueous solution 148.

FIGS. 10A-10C illustrate that the method for filtering contaminants which may further include the step 250 opening, when recommended by the water quality monitor 184, the door 192 at the base portion of the housing assembly 102 providing access to remove the removable aqueous solution tank member 140 and replacing the aqueous solution 148 therein. FIGS. 10A-10C illustrate that the method for filtering contaminants may which further include the step 255 of raising the at least one tube assembly 130 substantially vertically from the aqueous solution tank member 140. FIGS. 10A-10C illustrate that the method for filtering contaminants which may further include the step 260 of outwardly sliding and replacing the slidable air filter tray 195 designed to hold the at least one removable filter screen assembly 162. FIGS. 10A-10C illustrate that the method for filtering contaminants which may further include the step 265 of setting the intake fan assembly 120 on the at least one of at least three selectable fan speeds.

The following patents are incorporated by reference in their entireties: U.S. Pat. Nos. 6,616,733, 9,108,146 and 10,456,736.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A system for filtering contaminants from air comprising:
   a housing assembly further comprising at least one air inlet portion and at least one air exit portion;
   an intake fan assembly operationally coupled to the air inlet portion adapted to draw air from outside the housing assembly and propel the air through an at least one tube assembly leading to a bottom portion of an aqueous solution tank member holding an aqueous solution;
   a plurality of hole members formed or disposed on a submerged portion of the at least one tube assembly, the hole members adapted to release air bubbles from the at least one tube assembly, wherein the bubbles travel upward through the aqueous solution to a condensing chamber assembly;
   at least one cooling condenser coil assembly disposed in a first duct portion adapted to cool the air released from the bubbles, removing humidity and contaminants from the air, the humidity and contaminants gravitationally drawn toward the aqueous solution tank member, the air traveling to a second duct portion;
   at least one heating coil assembly at least partially heated by heat generated from a cooling mechanism, the heating coil assembly disposed in the second duct portion adapted to heat air traveling through the second duct portion;
   a dry filtration system operationally coupled to the second duct portion and overlaying the at least one air exit portion wherein the air must pass through at least one removable filter screen assembly to pass through the at least one air exit portion; and
   at least one electric motor assembly and control assembly operationally coupled to the intake fan assembly, the cooling condenser coil assembly and the heating coil assembly.

2. The system for filtering contaminants from air of claim 1 wherein the control assembly is an LED touch panel interface displaying at least a timer, a fan speed selector, a water quality monitor, a carbon filter screen monitor, and a power button actuator.

3. The system for filtering contaminants from air of claim 2 wherein the control assembly is disposed on a surface of the housing assembly.

4. The system for filtering contaminants from air of claim 1 wherein a door at a base portion of the housing assembly provides access to the aqueous solution tank member.

5. The system for filtering contaminants from air of claim 1 wherein an outwardly slidable air filter tray is adapted to hold the at least one removable filter screen assembly.

6. The system for filtering contaminants from air of claim 1 wherein the intake fan assembly has at least one selectable fan speeds.

7. The system for filtering contaminants from air of claim 1 wherein the aqueous solution tank is removable.

8. The system for filtering contaminants from air of claim 1 wherein at least one water sensor member is adapted to detect water contaminants.

9. The system for filtering contaminants from air of claim 1 wherein the at least one tube assembly is L-shaped and can be raised substantially vertically from the aqueous solution tank member.

10. A system for filtering contaminants from air comprising:
    a substantially cuboid housing assembly further comprising at least one air inlet portion disposed on an upper front portion of the housing assembly and at least one air exit portion disposed on an upper back portion of the housing assembly;
    an intake fan assembly operationally coupled to the air inlet portion adapted to draw air from outside the housing assembly and propel the air through a raisable L-shaped tube assembly leading to a bottom portion of a removable aqueous solution tank member holding substantially water;
    the at least one tube L-shaped tube assembly raisable substantially vertically from the aqueous solution tank member;
    the removable aqueous solution tank member slidably and horizontally removable from a lower door member of the housing assembly;
    at least one water quality monitor adapted to detect water contaminants;
    a plurality of hole members disposed substantially on an upper surface of a submerged portion of the L-shaped tube assembly, the hole members adapted to release bubbles from the L-shaped tube assembly wherein the bubbles travel upward through the aqueous solution to a condensing chamber assembly;
    at least one cooling condenser coil assembly disposed in a first duct portion adapted to cool the air released from the bubbles, removing humidity and contaminants from the air, the humidity and contaminants gravitationally drawn toward the aqueous solution tank member, the air traveling to a second duct portion;
    at least one heating coil assembly at least partially heated by heat generated from a cooling mechanism, the heating coil assembly disposed in the second duct portion adapted to heat air traveling through the second duct portion;
    a dry filtration system operationally coupled to the second duct portion and overlaying the at least one air exit portion wherein the air must pass through at least one removable carbon filter screen assembly within at least one substantially porous sleeve member to pass through the air exit portion;
    a control unit system disposed on a top portion of the housing assembly, the control unit system having at least one from a group of: a power control actuator, a timer, a carbon filter screen monitor, a fan control member, and the water quality monitor; and
    at least one electric motor assembly and control assembly operationally coupled to the intake fan assembly, the cooling condenser coil assembly, and the heating coil assembly.

11. The system of claim 10 wherein the control unit system includes a microcontroller adapted to control at least one from the group of: the power control actuator, the timer, the carbon filter screen monitor, the fan control member, and the water quality monitor are illuminated by an LED of an LED touch panel interface.

12. The system of claim 10 further comprising at least one of a Bluetooth communication module or transceiver module for wireless communication with an external network.

13. A method for filtering contaminants from air, the method comprising:
    activating a power control actuator disposed on a housing assembly, the actuator activating at least one electric motor assembly, the electric motor assembly operating at least one intake fan assembly, an at least one cooling condenser coil assembly, and an at least one heating coil assembly;

checking and setting the control members disposed on a control unit system having at least one from a group of: a power control actuator, a timer, a carbon filter screen monitor, a fan control member, and a water quality sensor member;

permitting air to enter at least one air inlet portion of the housing assembly further comprising the at least one air inlet portion and at least one air exit portion;

the intake fan assembly operationally coupled to the air inlet portion drawing air from outside the housing assembly and propelling the air through an at least one tube assembly leading to a bottom portion of an aqueous solution tank member holding an aqueous solution;

releasing bubbles from a plurality of hole members adapted to release bubbles from the at least one tube assembly wherein the bubbles travel upward through the aqueous solution to a condensing chamber assembly, the plurality of hole members disposed substantially on an upper surface of a submerged portion of the at least one tube assembly;

removing humidity and contaminants from the air, the humidity and contaminants gravitationally drawn toward the aqueous solution tank member, the air traveling to a second duct portion of the at least one cooling condenser coil assembly disposed in a first duct portion adapted to cool the air released from the bubbles;

at least partially heating the at least one heating coil assembly, the heating coil assembly at least partially heated by heat generated from a cooling mechanism, the heating coil assembly disposed in the second duct portion adapted to heat air traveling through the second duct portion; and the air passing a dry filtration system operationally coupled to the second duct portion and overlaying the at least one air exit portion wherein the air passes through at least one removable carbon filter screen assembly to pass through the air exit portion.

14. The method of claim 13, the method further including activating the control assembly, lighting an LED touch panel interface displaying at least a timer, fan speed selector, water quality monitor, carbon filter screen monitor, and power button actuator.

15. The method of claim 13, the method further including checking the at least one water quality monitor adapted to detect contaminants within the aqueous solution.

16. The method of claim 15, the method further including opening, when recommended by the water quality monitor, a door at a base portion of the housing assembly providing access to remove the removable aqueous solution tank member.

17. The method of claim 13, the method further including raising the at least one tube assembly substantially vertically from the aqueous solution tank member.

18. The method of claim 13, the method further including outwardly sliding and replacing a slidable air filter tray adapted to hold the at least one removable filter screen assembly.

19. The system of claim 10 further comprising a microphone and a speaker for near field communications, control and remote or near configuration of filtering operations of the filtering device.

* * * * *